United States Patent Office 3,336,270
Patented Aug. 15, 1967

3,336,270
PREPARATION OF ACRYLAMIDE-TYPE
WATER-SOLUBLE POLYMERS
Daniel J. Monagle, Wilmington, Del., assignor to Hercules Incorporated, a corporation of Delaware
No Drawing. Filed July 20, 1964, Ser. No. 383,934
17 Claims. (Cl. 260—79.3)

The present invention relates to a precipitation process of preparing acrylamide-type polymers which are soluble in water but insoluble in aqueous tertiary butanol, in which process the vinyl monomer is dissolved in aqueous tertiary butanol and polymerized therein either in the presence or absence of initiator and activator and in the substantial absence of air. More particularly, the present invention relates to such a process wherein the polymerization is carried out in the presence of a salt dissolved in the polymerization reaction mixture to give polymeric products in the form of unswollen, hard, nontacky granules which can be easily recovered from the polymerization reaction mixture and dried with conventional recovery and drying techniques without changing the properties thereof.

The term "polymer" is used herein to include both homopolymers and copolymers. The term "acrylamide-type polymers" as used herein is intended to include both acrylamide-type polymers and substituted acrylamide-type polymers, including without limitation of the foregoing methacrylamide and N-isopropyl acrylamide.

Polymers which may be prepared according to the present invention include those represented by the following three structural formulas:

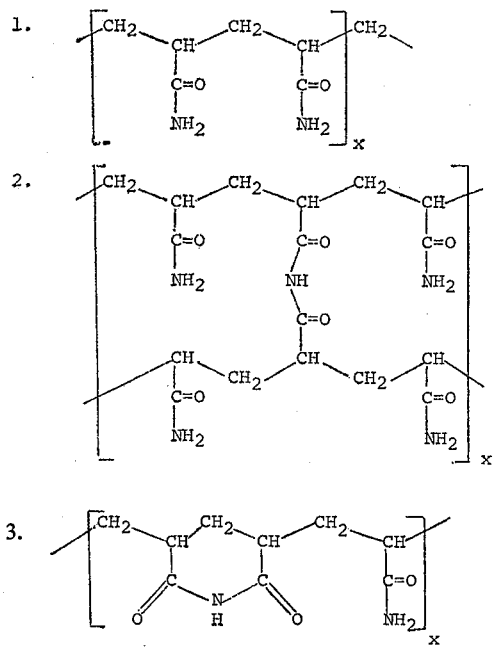

The actual structure of the polymer will depend upon whether the polymerization of the vinyl monomer takes place in the normal head-to-tail manner so as to produce a linear polymer (structural Formula 1) or in a manner resulting in intermolecular or intramolecular imide formation (structural Formulas 2 and 3, respectively). As is shown above, structural Formulas 2 and 3 actually represent cross-linked materials. While linear polymers usually are quite soluble in water, cross-linked polymers are usually difficultly soluble in water. The degree of solubility and the viscosity will depend upon the degree of intermolecular and/or intramolecular cross-linking involved. It is well known that relatively small amounts of divinyl monomer (included in a vinyl polymerization) produces polymers whose aqueous solutions have unusually high viscosity due to highly swollen gels resulting from a small number of cross-links. At the other extreme, polymers produced from divinyl monomers usually are insoluble, or swell to only a slight extent, and their aqueous solutions exhibit very low viscosity.

Although the prior art discloses numerous methods for preparing vinyl-type polymers, relatively few of these are applicable for water-soluble polymers. One prior art type process for preparing such polymers is known as a solution type process, having at least one virtue in that it enables a control over the exothermic polymerization reaction. However, these solution processes would be significantly improved if a means could be found to limit the viscosity increase of the reaction mixture during the polymerization so that the process would be more practical from the standpoint of handling during the polymerization and the subsequent isolation and more versatile from the standpoint of being able to produce higher molecular weight polymers.

In the solution type process, monomer is dissolved in an inert solvent and subsequently polymerized. The inert solvent may be an organic diluent or, in the case of water-soluble polymers, water. The reaction mixture thus obtained is quite viscous, the viscosity depending on the nature of the polymer, its concentration and its molecular weight. Such a mixture may be subsequently handled by any of the known techniques (i.e., roll drying, spray drying, precipitation and the like) to obtain a dry product. These techniques for isolation of product are usually inconvenient in that they are expensive, involving major equipment expenditures or require large volumes of precipitant.

Copending application, Ser. No. 358,069, in the names of Daniel J. Monagle and Walter P. Shyluk as inventors, entitled, "Process for the Preparation of Acrylamide-Type Water-Soluble Polymers," and filed on Apr. 7, 1964, discloses and claims a precipitation polymerization process of preparing the polymers of the present invention. However, it has recently been found that the polymeric products thereof are not as easily recovered and dried as desired, and this is true to a greater extent when operating the process on a plant scale. For instance, it has been found in recovering the polymeric products from the polymerization reaction mixture which had been made on a 1,000 gallon scale, difficulty was encountered in that there was too much tendency for the polymeric product to be swollen, soft and tacky to an undesirable degree. These particles also had too much tendency to agglomerate into undesirably large masses. Thus, while the process of said copending application is operable and satisfactory, it would be of substantial benefit if these difficulties could be overcome or minimized.

It has been found according to the present invention that the difficulties set forth hereinbefore and that the limitations of the prior art solution type processes can be overcome or minimized in preparing water-soluble polymers by carrying out a precipitation polymerization process which comprises dissolving acrylamide-type monomer in a tertiary butanol-water mixture wherein the amount of tertiary butanol is 35%–70% by weight of the resulting polymerization reaction mixture and allowing the monomer to polymerize in the presence of a salt dissolved in the polymerization reaction mixture, the amount of monomer and salt being 5%–30% and 0.1%–2.0% respectively, by weight of the polymerization reaction mixture. More particularly, it has been found in accordance with the present invention that carrying out said polymerization reaction even on a plant scale in the presence of a salt dissolved in the polymerization reaction mixture gives polymeric products in the form of unswollen, hard, nontacky granules which can be easily recovered from the polymerization reaction mixture and dried with conventional recovery and drying techniques without changing the properties thereof.

Thus by carrying out the polymerization in accordance with the present invention in the presence of a salt, or a buffer system comprising one or more of said salts in combination with another material to complete the buffer system, the polymeric products are obtained in the form of unswollen, hard, nontacky granules which are easily recovered and dried with conventional recovery and drying techniques. These salts and buffer systems include, e.g., (1) alkali metal and ammonium acetates, carbonates, bicarbonates, chlorides, phosphates, sulfates, bisulfates, borates; (2) chlorides and sulfates of copper and iron; (3) buffer systems comprising (a) mixtures of weak acid or weak base and their salts including (b) phthalates, citrates, borates, phosphates, acetates, ammonium hydroxide, ammonium acetate, ammonium chloride, (c) specific combinations including mixtures of boric acid-borax, citric acid-sodium acid phosphate, sodium carbonate-sodium bicarbonate, ammonium chloride-ammonium hydroxide, ammonium acetate-ammonium hydroxide; or (4) any combination of (1), (2) and (3).

The amount of salt which may be used is about 0.1%–2.0%, preferably about 0.2%–0.7%, by weight of the reaction mixture. If the amount of salt exceeds about 2.0%, usually there is a tendency for the granules of the polymeric product to agglomerate in the polymerization reaction mixture.

The manner of adding the salt and the point at which it is added are not critical. Of course, substantially all of the salt added should be in solution in the polymerization reaction mixture and it should be in solution throughout a substantial portion of the polymerization. The salt can be added either as an aqueous solution or it can be added directly as a solid to the monomer solution. For example, an N-normal salt solution in water can be prepared and the monomer dissolved in the aqueous salt solution. This solution can then be diluted with tertiary butanol to give the final polymerization reaction mixture. Instead of in the manner just described, the salt can be added directly to an aqueous alcohol solution of the monomer.

Monomers applicable in the present invention include those selected from the group consisting of (1) acrylamide alone and (2) acrylamide as a comonomer with the following: (a) acrylonitrile; (b) vinyl monomers containing hydrophilic salt groups including ($b^1$) vinyl sodium carboxylates, e.g. sodium acrylate, sodium methacrylate, ($b^2$) vinyl sodium sulfonates, e.g. sodium ethylene sulfonate, ($b^3$) vinyl quaternary ammonium salts including those derived from dialkylaminoalkyl methacrylate (e.g. β-methacryloyloxyethyltrimethylammonium methyl sulfate), dialkylaminoalkyl acrylate, dialkylaminoalkyl vinyl ether, ($b^4$) vinyl pyridinium salts including those derived from 2-vinyl pyridine, 4-vinyl pyridine, 2-methyl 5-vinyl pyridine (e.g. 1,2-dimethyl-5-vinyl pyridinium methyl sulfate), 2-vinyl 5-ethyl pyridine, ($b^5$) vinyl sulfonium salts including those analogous to the quaternary ammonium salts in ($b^3$) above, and (c) a vinyl pyrrolidone.

Several of the conditions of the precipitation polymerization process of the present invention are critical and these conditions will now be discussed.

The solvent must be aqueous tertiary butanol (i.e. mixtures of tertiary butanol and water). Various other solvents were tried but found to be unsuitable. Other solvents tried included aqueous methanol, aqueous ethanol, and aqueous isopropanol. η-Butanol and the higher homologs were found to be unsatisfactory primarily because they were immiscible with water at the alcohol concentrations applicable herein.

The concentration of tertiary butanol in said solvent must be 35%–70%, preferably 40%–55%, by weight of said mixture. When the concentration of tertiary butanol in the solvent is below 35%, the polymeric product forms as a gel mass instead of precipitating as discrete particles according to the present invention. When the concentration of tertiary butanol in the solvent is above 70%, the polymer product forms as undesirably large, sticky, gel particles instead of precipitating as desirably small, discrete particles according to the present invention.

The monomer concentration should be about 5%–30%, preferably about 15%–25%, by weight of the total polymerization reaction mixture. When the monomer concentration is above about 30%, the polymeric product forms as undesirably large, sticky gel particles instead of precipitating as desirably small, discrete particles according to the present invention. The polymerization becomes less practical as the monomer concentration goes below about 5%. When using monomer concentrations below about 5%, the polymeric product is apt to be produced in the form of a suspension instead of the desired precipitate in accordance with the present invention.

The monomers used must be soluble in the water-tertiary butanol mixture and the polymeric products prepared from these monomers must be insoluble in said mixture. Such polymerizations must be carried out in the substantial absence of air, the usual methods for removing air from the polymerization system being employed, e.g. by nitrogen displacement.

Although polymerization temperature and time in accordance with the present invention are not critical nor per se a part of the present invention, they are significant as anyone skilled in the art will appreciate. The polymerization temperature is dependent on the particular initiator used in the system. Temperatures of about 20° C.–80° C. have given satisfactory results with potassium persulfate in accordance with the present invention. Preferably a temperature of about 45° C.–55° C. will be employed. Temperatures below 20° C. can be used if the increased time can be tolerated. When the temperature is above about 80° C., the process of this invention is less practical because the polymerization must be carried out under pressure.

The polymerization reaction may be carried out either in the absence or presence of a polymerization initiator. Both the amounts and types of free radical initiators applicable are well known in the art. If an initiator is used, amounts up to 0.5 weight percent, based on the monomer, give good results. Preferably, the amount of initiator used will be about 0.05%–0.2%. Peroxygen compounds, in general, function well as initiators. These peroxygen compounds include, for example, ammonium persulfate, potassium persulfate, and hydrogen peroxide. $a,a'$-azo-bisisobutyronitrile also works well as an initiator. An initiator may be used alone or in combination with an activator to reduce the induction period of the polymerization recation. Likewise, these activators are well known in the art. These activators form a redox system with an initiator. Sodium bisulfite and ferrous chloride activators work quite successfully in combination with potassium persulfate and hydrogen peroxide initiators, respectively, in accordance with the present invention.

The following examples, wherein parts and percent are by weight unless otherwise indicated, illustrate various specific embodiments of the present invention. When both monomer and initiator are used they are dissolved in the aqueous tertiary butanol solvent. Air was removed from the polymerization reaction vessel by displacing the air with nitrogen. Activator, if used, may be added at this time. Agitation was maintained throughout the polymerization. The polymerization reaction mixture was filtered and the polymeric product dried. Further details appear in Tables 1–5 hereinafter.

TABLE 1.—PRECIPITATION POLYMERIZATION PROCESS OF MAKING ACRYLAMIDE-TYPE WATER-SOLUBLE POLYMERS
[Variable: Type salt]

| Example No. | Salt | | Monomer(s) | | TBA Conc., Percent [3] | Remarks |
|---|---|---|---|---|---|---|
| | Type | Amount [1] | Name | Conc., Percent [2] | | |
| 1 | Potassium chloride | 0.19 | ([4]) | 20 | 40 | Slurry of polymer particles as unswollen, hard, nontacky granules. |
| 2 | Ammonium chloride | 0.27 | ([4]) | 20 | 40 | Do. |
| 3 | Ammonium sulfate | 1.0 | ([4]) | 20 | 40 | Do. |
| 4 | Sodium chloride | 0.3 | ([4]) | 20 | 40 | Do. |
| 5 | Sodium sulfate | 0.7 | ([4]) | 20 | 40 | Do. |
| 6 | Sodium carbonate | 1.0 | ([4]) | 20 | 40 | Do. |
| 7 | Borax-boric acid | 0.95–0.31 | ([4]) | 20 | 40 | Do. |
| 8 | Citric acid-sodium biphosphate | 0.03–1.42 | ([4]) | 20 | 40 | Do. |
| 9 | Sodium carbonate-sodium bicarbonate | 0.006–0.43 | ([4]) | 20 | 40 | Do. |
| 10 | Ammonium chloride-ammonium hydroxide | 0.11–0.05 | ([4]) | 20 | 40 | Do. |

[1] and [2] Percent by weight of total polymerization reaction mixture.
[3] Percent by weight of tertiary butanol based on tertiary butanol-water mixture.
[4] 85% acrylamide, 15% β-methacryloyloxyethyltrimethylammonium methyl sulfate (MTMMS).

TABLE 2.—PRECIPITATION POLYMERIZATION PROCESS OF MAKING ACRYLAMIDE-TYPE WATER-SOLUBLE POLYMERS
[Variable: Amount salt]

| Example No. | Salt | | Monomer(s) | | TBA Conc., Percent [3] | Remarks |
|---|---|---|---|---|---|---|
| | Type | Amount [1] | Name | Conc., Percent [2] | | |
| 11 | Ammonium chloride-ammonium hydroxide | 0.22–0.04 | ([4]) | 20 | 40 | Slurry of polymer particles as unswollen, hard, nontacky granules. |
| 12 | Potassium chloride | 0.07 | ([4]) | 20 | 40 | Do. |
| 13 | ___do___ | 0.15 | ([4]) | 20 | 40 | Do. |
| 14 | ___do___ | 0.44 | ([4]) | 20 | 40 | Do. |
| 15 | ___do___ | 0.74 | ([4]) | 20 | 40 | Do. |
| 16 | Sodium chloride | 0.30 | ([4]) | 20 | 40 | Do. |
| 17 | ___do___ | 1.96 | ([4]) | 20 | 40 | Do. |
| 18 | Sodium sulfate | 0.70 | ([4]) | 20 | 40 | Do. |

[1] and [2] Percent by weight of total polymerization reaction mixture.
[3] Percent by weight of tertiary butanol based on tertiary butanol-water mixture.
[4] 85% acrylamide, 15% β-methacryloyloxyethyltrimethylammonium methyl sulfate (MTMMS).

TABLE 3.—PRECIPITATION POLYMERIZATION PROCESS OF MAKING ACRYLAMIDE-TYPE WATER-SOLUBLE POLYMERS
[Variable: Monomer]

| Example No. | Salt | | Monomer(s) | | TBA Conc., Percent [3] | Remarks |
|---|---|---|---|---|---|---|
| | Type | Amount [1] | Name | Conc., Percent [2] | | |
| 19 | Ammonium chloride-ammonium hydroxide | 0.11–0.05 | ([4]) | 20 | 40 | Slurry of polymer particles as unswollen, hard, nontacky granules. |
| 20 | ___do___ | 0.11–0.05 | ([5]) | 20 | 40 | Do. |
| 21 | ___do___ | 0.11–0.05 | ([6]) | 20 | 40 | Do. |
| 22 | ___do___ | 0.11–0.05 | ([7]) | 20 | 40 | Do. |
| 23 | ___do___ | 0.11–0.05 | ([8]) | 20 | 40 | Do. |
| 24 | ___do___ | 0.11–0.05 | ([9]) | 20 | 40 | Do. |
| 25 | ___do___ | 0.11–0.05 | ([10]) | 20 | 40 | Do. |

[1] and [2] Percent by weight of total polymerization reaction mixture.
[3] Percent by weight of tertiary butanol based on tertiary butanol-water mixture.
[4] Acrylamide.
[5] 90% acrylamide, 10% acrylic acid.
[6] 90% acrylamide, 10% acrylonitrile.
[7] 90% acrylamide, 10% DMPMS.
[8] 80% acrylamide, 20% vinyl pyrrolidone.
[9] 63% methacrylamide, 37% MTMMS.
[10] 63% methacrylamide, 37% DMPMS.
NOTE.—DMPMS is 1,2-dimethyl-5-vinyl pyridinium methyl sulfate.

TABLE 4.—PRECIPITATION POLYMERIZATION PROCESS OF MAKING ACRYLAMIDE-TYPE WATER-SOLUBLE POLYMERS
[Variable: Monomer concentration]

| Example No. | Salt | | Monomer(s) | | TBA Conc., Percent [3] | Remarks |
|---|---|---|---|---|---|---|
| | Type | Amount [1] | Name | Conc., Percent [2] | | |
| 26 | Ammonium chloride-ammonium hydroxide | 0.11–0.05 | ([4]) | 10 | 40 | Slurry of polymer particles as unswollen, hard, nontacky granules. |
| 27 | ___do___ | 0.11–0.05 | ([4]) | 15 | 40 | Do. |
| 28 | ___do___ | 0.11–0.05 | ([4]) | 25 | 40 | Do. |
| 29 | ___do___ | 0.11–0.05 | ([4]) | 30 | 40 | Do. |

[1] and [2] Percent by weight of total polymerization reaction mixture.
[3] Percent by weight of tertiary butanol based on tertiary butanol-water mixture.
[4] 85% acrylamide, 15% β-methacryloyloxyethyltrimethylammonium methyl sulfate (MTMMS).

TABLE 5.—PRECIPITATION POLYMERIZATION PROCESS OF MAKING ACRYLAMIDE-TYPE WATER-SOLUBLE POLYMERS

[Variable: TBA concentration]

| Example No. | Salt | | Monomer(s) | | TBA Conc., Percent [3] | Remarks |
|---|---|---|---|---|---|---|
| | Type | Amount [1] | Name | Conc., Percent [2] | | |
| 30 | Ammonium chloride-ammonium hydroxide. | 0.11–0.05 | ([4]) | 20 | 30 | Hazy gel—inoperable. |
| 31 | ----do---- | 0.11–0.05 | ([4]) | 20 | 35 | Slurry of polymer particles as unswollen, hard, nontacky granules. |
| 32 | ----do---- | 0.11–0.05 | ([4]) | 20 | 40 | Do. |
| 33 | ----do---- | 0.11–0.05 | ([4]) | 20 | 55 | Do. |
| 34 | ----do---- | 0.11–0.05 | ([4]) | 20 | 70 | Do. |

[1] and [2] Percent by weight of total polymerization reaction mixture.
[3] Percent by weight of tertiary butanol based on tertiary butanol-water mixture.
[4] 85% acrylamide, 15% β-methacryloyloxyethyltrimethylammonium methyl sulfate (MTMMS).

As many apparent and widely different embodiments of this invention may be made without departing from the spirit and scope thereof, it is to be understod that the invention is not limited to the specific embodiments thereof except as defined in the appended claims.

What I claim and desire to protect by Letters Patent is:

1. Process of preparing water-soluble polymers which comprises dissolving acrylamide-type monomer having the formula:

$$CH_2=C-C-N\diagup^{R_2}_{R_3}$$
$$\underset{R_1\ \ O}{|\ \ \ ||}$$

wherein $R_1$, $R_2$ and $R_3$ are each selected from the group consisting of hydrogen and lower alkyl and a nonpolymerizable salt, said salt being selected from the group consisting of (1) alkali metal and ammonium acetates, carbonates, bicarbonates, chlorides, phosphates, sulfates, bisulfates, borates, (2) weak acids and their corresponding alkali metal and ammonium salts, (3) ammonium hydroxide in combination with its acetate, carbonate, bicarbonate, chloride, phosphate, sulfate, bisulfate, and borate salts, and (4) combinations of (1)–(3) above in a tertiary butanol-water mixture wherein the amounts of tertiary butanol and monomer are 35%–70% and 5%–30%, respectively, by weight of said mixture, and allowing the monomer to polymerize to give polymers which precipitate out of said tertiary butanol-water mixture in the form of unswollen, hard, nontacky granules.

2. Process of claim 1 wherein the amount of salt is about 0.1%–2.0% by weight of the polymerization reaction mixture.

3. Process of claim 1 wherein the monomer is acrylamide.

4. Process of claim 1 wherein the monomer is a vinyl monomer containing hydrophilic salt groups together with acrylamide.

5. Process of claim 1 wherein the monomer is a vinyl quaternary ammonium salt together with acrylamide.

6. Process of claim 1 wherein the monomer is a vinyl quaternary ammonium salt derived from dialkylaminoalkyl methacrylate together with acrylamide.

7. Process of claim 1 wherein the monomer is β-methacrylolyloxyethyltrimethylammonium methyl sulfate together with acrylamide.

8. Process of claim 1 wherein the monomer is a vinyl pyridinium salt together with acrylamide.

9. Process of claim 1 wherein the monomer is a vinyl pyridinium salt derived from 2-methyl-5-vinyl pyridine together with acrylamide.

10. Process of claim 1 wherein the monomer is 1,2-dimethyl-5-vinyl pyridinium methyl sulfate together with acrylamide.

11. Process of claim 1 wherein the monomer is a vinyl pyrrolidone together with acrylamide.

12. Process of claim 1 wherein the monomer is 1-vinyl-2-pyrrolidone together with acrylamide.

13. Process of claim 1 wherein the monomer is acrylic acid together with acrylamide.

14. Process of claim 1 wherein the monomer is acrylonitrile together with acrylamide.

15. Process of claim 1 wherein the monomer is β-methacryloyloxyethyltrimethylammonium methyl sulfate together with methacrylamide.

16. Process of claim 1 wherein the monomer is 1,2-dimethyl-5-vinyl pyridinium methyl sulfate together with acrylamide.

17. Process of claim 1 wherein the monomer is sodium acrylate together with acrylamide.

References Cited

UNITED STATES PATENTS

| | | | |
|---|---|---|---|
| 2,764,578 | 9/1956 | Barney | 260—80.3 |
| 3,006,900 | 10/1961 | Fikentscher et al. | 260—80.3 |
| 3,008,851 | 11/1961 | Zeitschel | 260—89.3 |
| 3,040,012 | 7/1962 | Maeder | 260—80.3 |
| 3,062,785 | 11/1962 | Laakso et al. | 260—89.7 |
| 3,235,490 | 2/1966 | Goren | 260—89.7 |
| 3,254,138 | 5/1966 | Hagemeyer | 260—85.5 |
| 3,265,654 | 8/1966 | Glabisch et al. | 260—79.3 |

OTHER REFERENCES

Hill et al., Journ. Poly. Sci., vol. 47 (1960), pages 397–402 (copy in Group 140).

JOSEPH L. SCHOFER, *Primary Examiner.*

D. K. DENENBERG, *Assistant Examiner.*